US007477291B2

(12) United States Patent
Seo

(10) Patent No.: US 7,477,291 B2
(45) Date of Patent: Jan. 13, 2009

(54) ANTI-SHAKE APPARATUS

(75) Inventor: Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 871 days.

(21) Appl. No.: 11/078,367

(22) Filed: Mar. 14, 2005

(65) Prior Publication Data
US 2005/0206735 A1 Sep. 22, 2005

(30) Foreign Application Priority Data
Mar. 17, 2004 (JP) ............................. P2004-075791

(51) Int. Cl.
*H04N 5/228* (2006.01)
(52) U.S. Cl. .............. 348/208.7; 348/208.4; 348/208.2; 348/208.99
(58) Field of Classification Search ................................ 348/208.99–208.16
See application file for complete search history.

(56) References Cited

U.S. PATENT DOCUMENTS

| 5,619,030 | A  | * | 4/1997  | Shiomi ................. 250/201.1 |
| 5,974,269 | A  |   | 10/1999 | Sato et al. |
| 6,374,048 | B1 | * | 4/2002  | Uenaka et al. ................. 396/52 |
| 6,486,910 | B1 | * | 11/2002 | Kaneda et al. ......... 348/208.99 |
| 6,930,708 | B1 | * | 8/2005  | Sato et al. .............. 348/208.99 |
| 6,985,176 | B2 | * | 1/2006  | Noguchi ................ 348/208.11 |
| 7,161,621 | B2 | * | 1/2007  | Kai et al. ............... 348/208.11 |
| 7,268,336 | B2 | * | 9/2007  | Hsieh et al. .............. 250/208.1 |
| 7,409,150 | B2 | * | 8/2008  | Makii ......................... 396/55 |
| 2001/0007469 | A1 | * | 7/2001 | Fuchimukai et al. ........ 348/208 |
| 2003/0067544 | A1 |   | 4/2003 | Wada |
| 2004/0012683 | A1 | * | 1/2004 | Yamasaki et al. ......... 348/208.1 |
| 2006/0017815 | A1 | * | 1/2006 | Stavely et al. ............ 348/208.7 |
| 2006/0033818 | A1 | * | 2/2006 | Wada et al. ............. 348/208.11 |

FOREIGN PATENT DOCUMENTS

JP          10-142647          5/1998

(Continued)

OTHER PUBLICATIONS

English Language Abstract of JP 2002-229090.

(Continued)

*Primary Examiner*—David L Ometz
*Assistant Examiner*—Richard M Bemben
(74) *Attorney, Agent, or Firm*—Greenblum & Bernstein, P.L.C.

(57) ABSTRACT

An anti-shake apparatus of a photographing-apparatus comprises a movable-unit and a fixed-unit. The movable-unit has an imaging device and a position-detecting coil, and is movable on a plane which is perpendicular to an optical axis of a camera lens of the photographing-apparatus. The fixed-unit supports the movable-unit so as to be movable on said plane, and has a hall element for detecting a position of the movable-unit on the plane. The position-detecting coil is a magnetic-field generating apparatus which is used for detecting the position, and has first and second position-detecting segments. The first and second position-detecting segments are parts of the position-detecting coil, and face the hall element, and are perpendicular to a movement direction of the movable-unit and to the optical axis. The direction of the current through the first position-detecting segment is opposite to a direction of the current through the second position-detecting segment.

9 Claims, 9 Drawing Sheets

FOREIGN PATENT DOCUMENTS

JP   2002-229090   8/2002
JP   2003-110919   4/2003

OTHER PUBLICATIONS

English Language Abstract of JP 2003-110919.
U.S. Appl. No. 11/044,055 Uenaka et al., filed Jan. 28, 2005.
U.S. Appl. No. 11/044,054 Uenaka et al., filed Jan. 28, 2005.
U.S. Appl. No. 11/065,577 Uenaka, filed Feb. 25, 2005.
U.S. Appl. No. 11/065,354 Uenaka et al., filed Feb. 25, 2005.
U.S. Appl. No. 11/073,638 Uenaka et al., filed Mar. 8, 2005.
U.S. Appl. No. 11/073,604 Uenaka et al., filed Mar. 8, 2005.
U.S. Appl. No. 11/071,234 Uenaka, filed Mar. 4, 2005.
U.S. Appl. No. 11/071,220 Uenaka et al., filed Mar. 4, 2005.
U.S. Appl. No. 11/071,241 Uenaka, filed Mar. 4, 2005.
U.S. Appl. No. 11/071,242 Uenaka, filed Mar. 4, 2005.
U.S. Appl. No. 11/044,010 Uenaka, filed Jan. 28, 2005.

* cited by examiner

ANTI-SHAKE APPARATUS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus performs a moving operation of a movable unit, which includes a hand-shake correcting lens, by using a permanent magnet and a coil, and a position-detecting operation of the movable unit, by using a hall element and a permanent magnet.

However, the magnet and yoke are enlarged in first and second directions which are perpendicular to the optical axis and meet vertically, because the parts of the magnet and yoke for detecting the position of the movable unit in the first direction extend toward the parts of the magnet and yoke for moving the movable unit in the first direction, and the parts of the magnet and yoke for detecting the position of the movable unit in the second direction extend toward the parts of the magnet and yoke for moving the movable unit in the second direction.

SUMMARY OF THE INVENTION

Therefore, an object of the present invention is to provide an apparatus in which the size of the anti-shake apparatus is reduced, by reducing the weight of the movable unit.

According to the present invention, an anti-shake apparatus of a photographing apparatus comprises a movable unit and a fixed unit.

The movable unit has one of an imaging device and a hand-shake correcting lens, and has a position-detecting coil, and can be moved in first and second directions. The first direction is perpendicular to an optical axis of a camera lens of the photographing apparatus. The second direction is perpendicular to the optical axis and the first direction.

The fixed unit slidably supports the movable unit in both the first and second directions, and has a magnetic-field change-detecting unit.

The magnetic-field change-detecting unit has a horizontal magnetic-field change-detecting element which is used for detecting a position of the movable unit in the first direction as a first location, and a vertical magnetic-field change-detecting element which is used for detecting a position of the movable unit in the second direction as a second location.

The position-detecting coil is a magnetic-field generating apparatus which is used for detecting the first and second locations, and has first and second position-detecting areas.

The first position-detecting area has first and second horizontal position-detecting segments.

The second position-detecting area has first and second vertical position-detecting segments.

The first and second horizontal position-detecting segments are parts of the position-detecting coil, and face the horizontal magnetic-field change-detecting element, and are parallel to the second direction.

A direction of the current through the first horizontal position-detecting segment is opposite to a direction of the current through the second horizontal position-detecting segment.

The first and second vertical position-detecting segments are parts of the position-detecting coil, and face the vertical magnetic-field change-detecting element, and are parallel to the first direction.

A direction of the current through the first vertical position-detecting segment is opposite to a direction of the current through the second vertical position-detecting segment.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
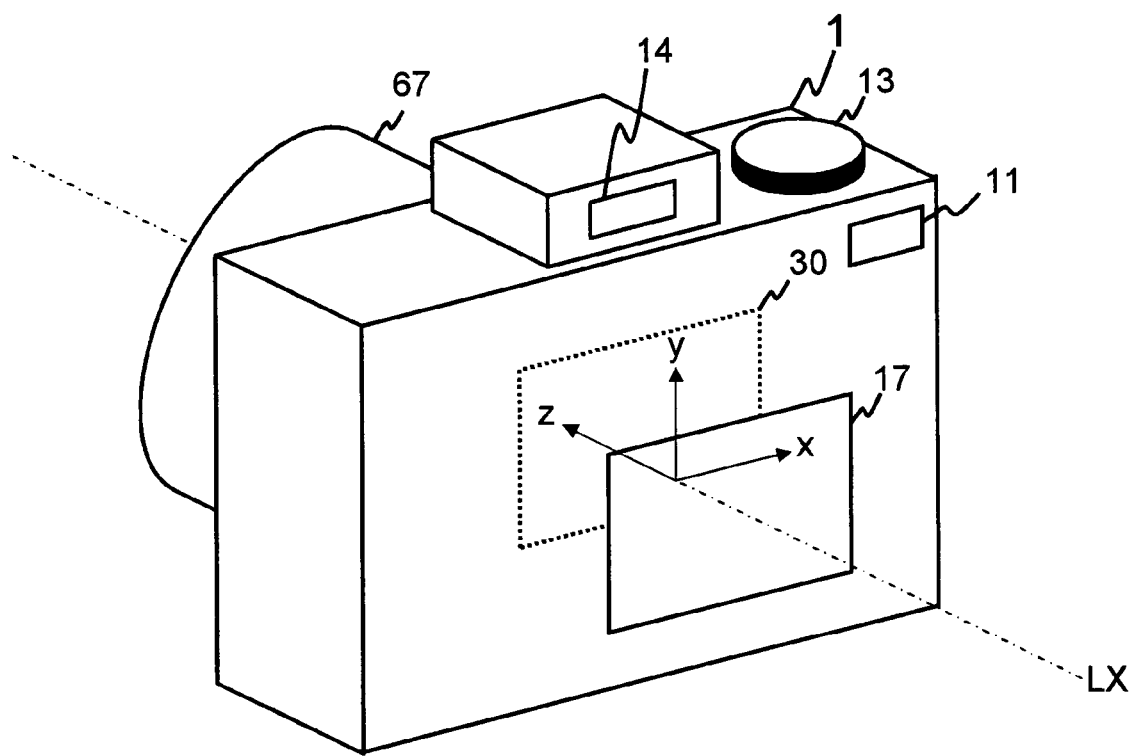
FIG. 1 is a perspective view of a photographing apparatus of the embodiment viewed from the back side of the photographing apparatus.

The present invention is described below with reference to the embodiments shown in the drawings. In these embodiments, the photographing apparatus 1 is a digital camera. The photographing apparatus 1 has an optical axis LX.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

A first embodiment is explained by using FIGS. 1 to 8.

Figure 4:
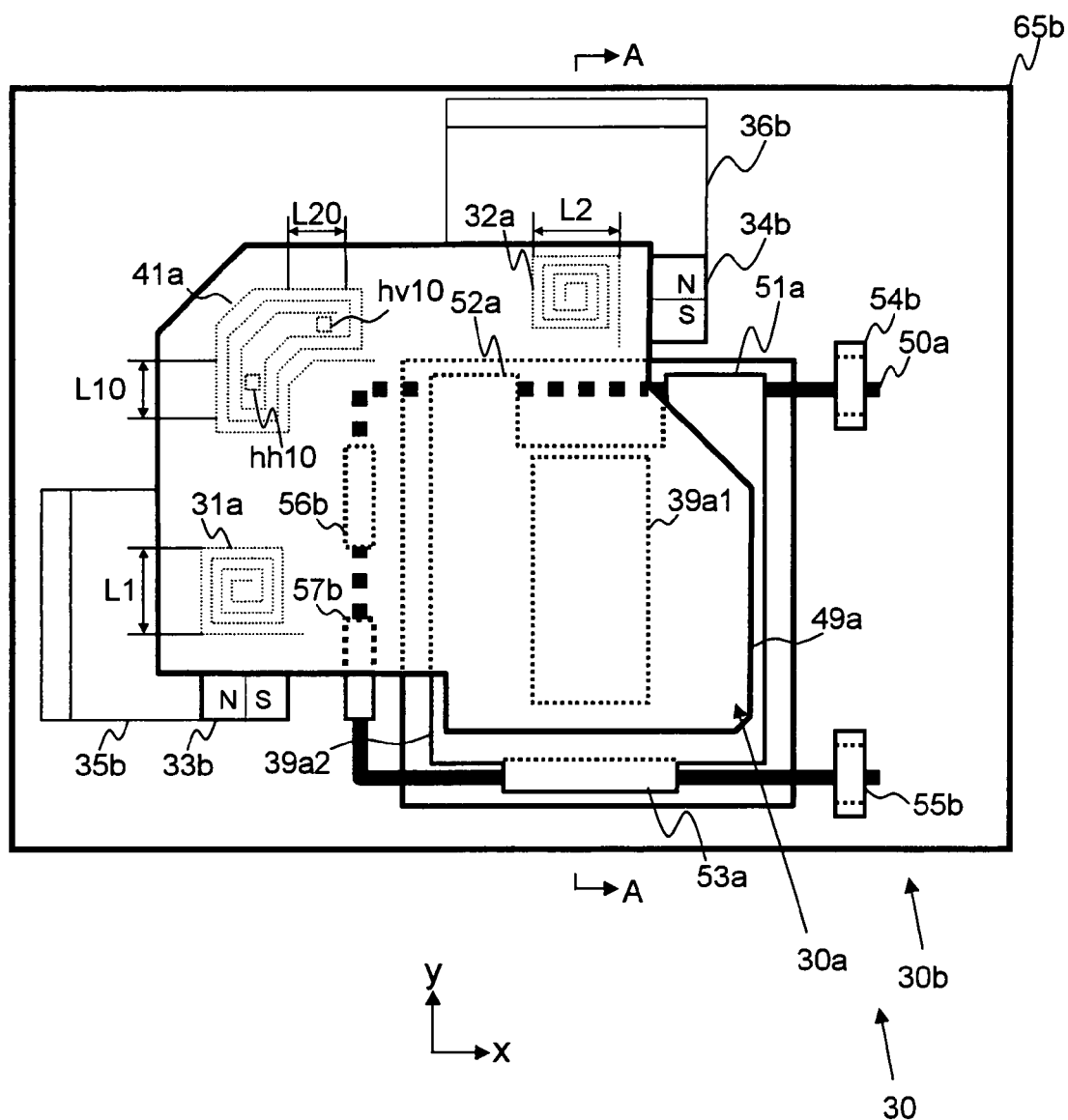
FIG. 4 is a figure showing the construction of the anti-shake unit.
Figure 5:
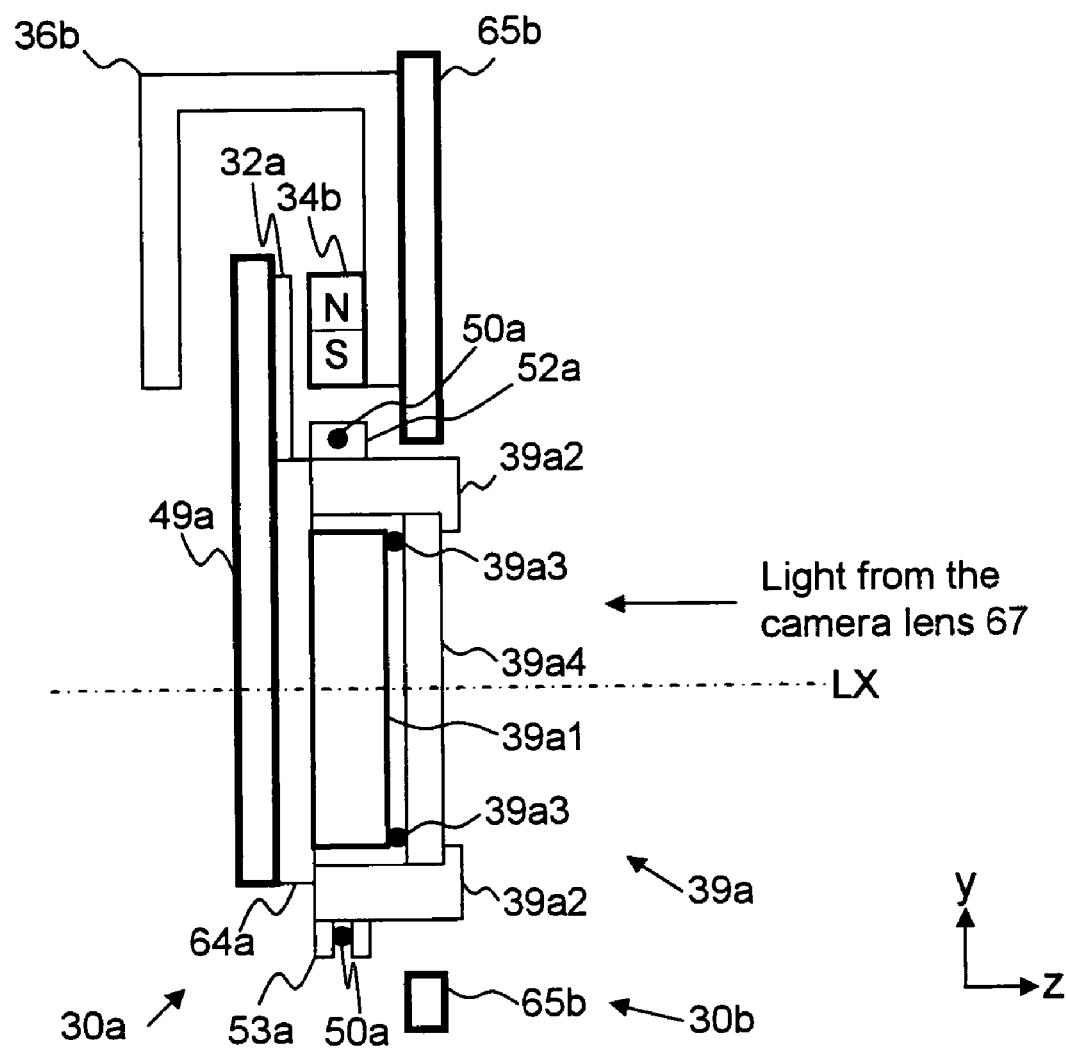
FIG. 5 is a view along line A-A of FIG. 4.

FIG. 5 shows a construction diagram of the section along line A-A of FIG. 4. FIG. 7 shows a construction diagram of the section along line B-B of FIG. 6.

Figure 2:
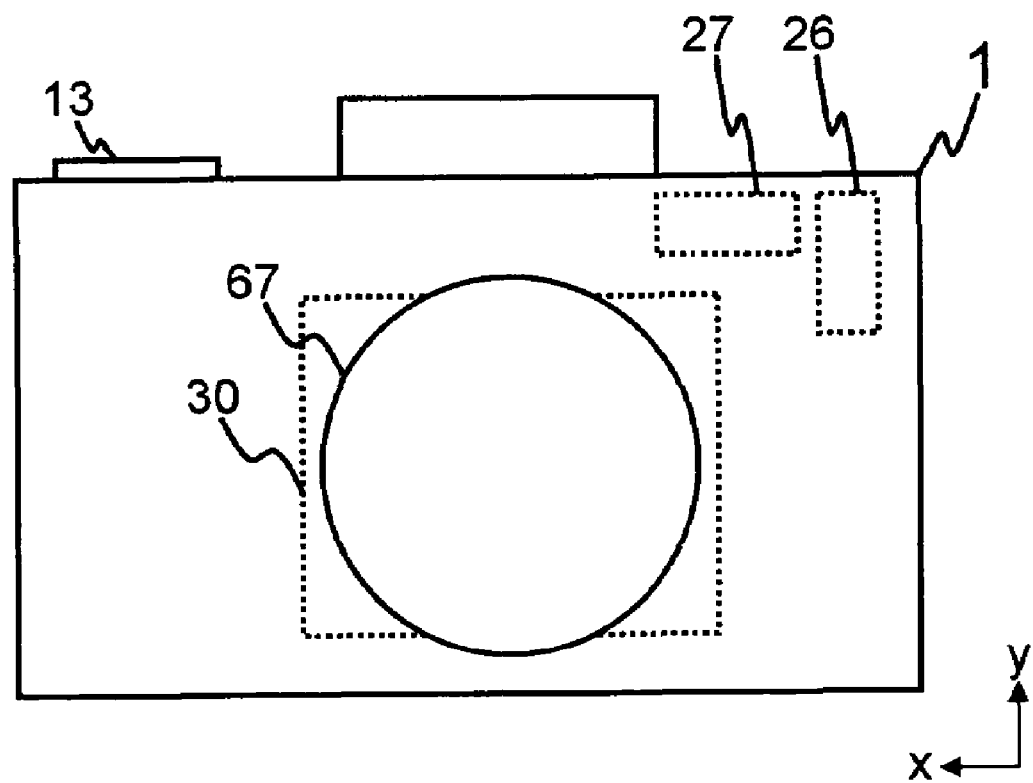
FIG. 2 is a front view of the photographing apparatus.
Figure 3:
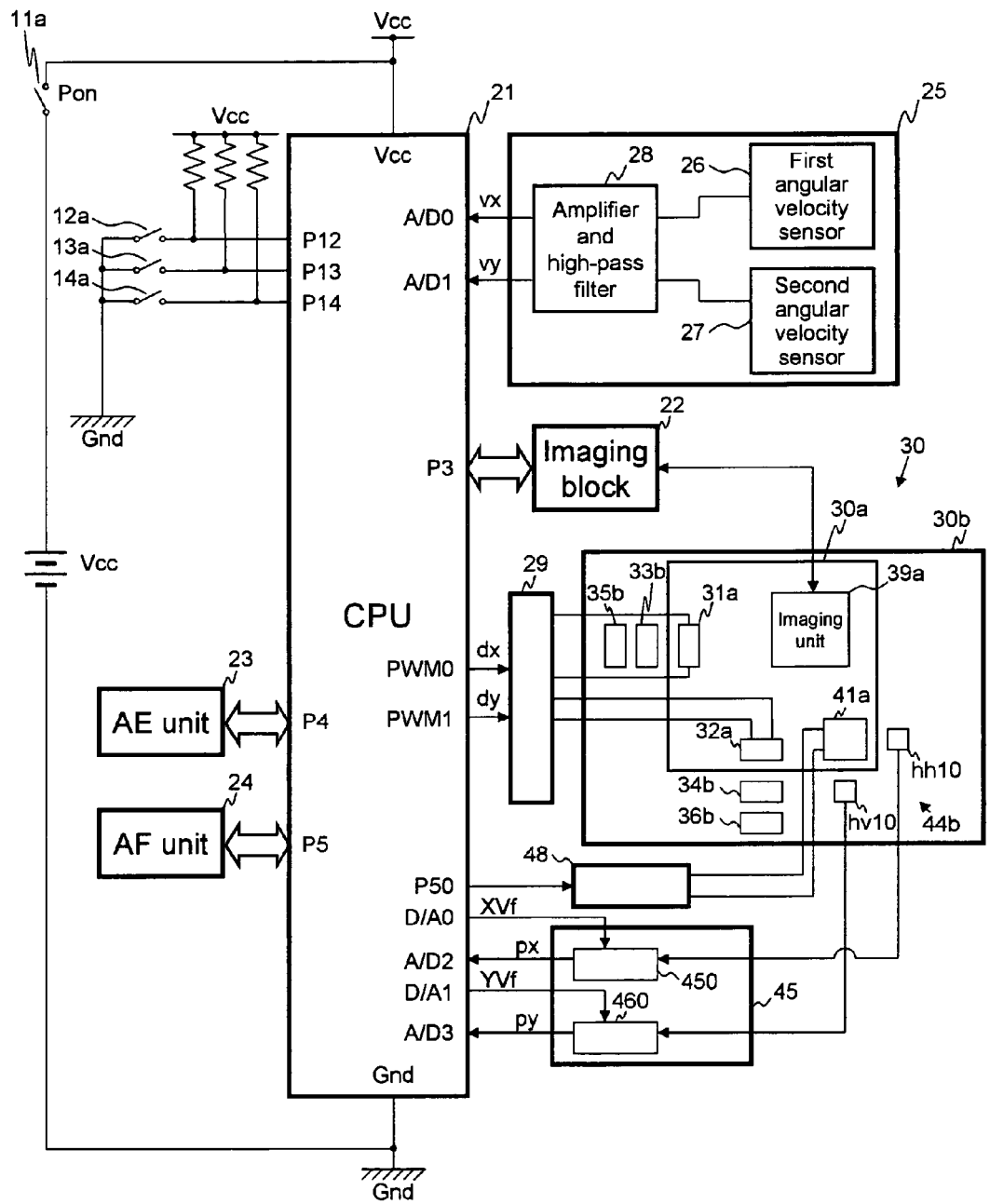
FIG. 3 is a circuit construction diagram of the photographing apparatus.

The imaging part of the photographing apparatus 1 comprises a Pon button 11, a Pon switch 11a, a photometric switch 12a, a release button 13, a release switch 13a, an indicating unit 17 such as an LCD monitor etc., a CPU 21, an imaging block 22, an AE (automatic exposure) unit 23, an AF (automatic focusing) unit 24, an imaging unit 39a in the anti-shake apparatus 30, and a camera lens 67 (see FIGS. 1, 2, and 3).

Whether the Pon switch 11a is in the on state or the off state, is determined by a state of the Pon button 11, so that the ON/OFF states of the photographing apparatus 1 are changed corresponding to the ON/OFF states of the Pon switch 11a.

The photographic subject image is taken as an optical image through the camera lens 67 by the imaging block 22, which drives the imaging unit 39a, so that the image, which is taken, is indicated on the indicating unit 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the camera lens 67 is moved in the optical axis LX direction.

The anti-shaking part of the photographing apparatus 1 comprises an anti-shake button 14, an anti-shake switch 14a, a CPU 21, an angular velocity detecting unit 25, a first driver circuit 29, an anti-shake apparatus 30, a hall-element signal-processing unit 45, and the camera lens 67.

When the anti-shake button 14 is fully pushed by the operator, the anti-shake switch 14a changes to the on state, so that the anti-shake operation is performed where the angular velocity detecting unit 25 and the anti-shake apparatus 30 are driven, at every predetermined time interval, independently of the other operations which include the photometric operation etc.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

Next, the details of the input and output relationship with the CPU 21 for the angular velocity unit 25, the first driver circuit 29, the anti-shake apparatus 30, the hall-element signal-processing unit 45, and the second driver circuit 48, are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1, to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved to, corresponding to the hand-shake quantity which is calculated, for the first direction x and the second direction y.

The location in the first direction x of the position S is defined as sx, and the location in the second direction y of the position S is defined as sy. The movement of the movable unit 30a, which includes the imaging unit 39a, is performed by using electro-magnetic force and is described later. The driving force D, which drives the first driver circuit 29 in order to move the movable unit 30a to the position S, has a first PWM duty dx as the driving-force component in the first direction x, and a second PWM duty dy as the driving-force component in the second direction y.

The anti-shake apparatus 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake apparatus 30 has a movable unit 30a, which includes the imaging unit 39a, and a fixed unit 30b. Or, the anti-shake apparatus 30 is composed of a driving part which moves the movable unit 30a by electro-magnetic force to the position S, and a position-detecting part which detects the position of the movable unit 30a (a detected-position P).

The size and the direction of the electro-magnetic force are determined by the size and the direction of the current which flows in the coil, and the size and the direction of the magnetic-field of the magnet.

The driving of the movable unit 30a of the anti-shake apparatus 30, is performed by the first driver circuit 29 which has the first PWM duty dx input from the PWM 0 of the CPU 21 and has the second PWM duty dy input from the PWM 1 of the CPU 21. The detected-position P of the movable unit 30a, either before moving or after moving, which is moved by driving the first driver circuit 29, is detected by the hall element unit 44b and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The movable unit 30a has a first driving coil 31a, a second driving coil 32a, an imaging unit 39a, a first position-detecting coil 41a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 4 and 5).

The first position-detecting coil 41a is used as a magnetic-field generating apparatus for detecting the position of the movable unit 30a.

The fixed unit 30b has a first driving magnet 33b, a second driving magnet 34b, a first driving yoke 35b, a second driving yoke 36b, a hall element unit 44b, a first bearing unit for vertical movement 54b, a second bearing unit for vertical movement 55b, a third bearing unit for vertical movement 56b, a fourth bearing unit for vertical movement 57b, and a base board 65b.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y).

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x).

When the center area of the imaging device 39a1 is located on the optical axis LX of the camera lens 67, the location relation between the movable unit 30a and the fixed unit 30b is set up so that the movable unit 30a is located at the center of its movement range in both the first direction x and the second direction y, in order to utilize the full size of the imaging range of the imaging device 39a1.

A rectangle shape, which forms the imaging surface (the valid pixel area) of the imaging device 39a1, has two diagonal lines. In the first embodiment, the center of the imaging device 39a1 is the crossing point of these two diagonal lines.

In the first embodiment, the center of the imaging device 39a1 agrees with the center of gravity of the rectangle shape of the valid pixel area. Accordingly, when the movable unit 30a is located at the center of its movement range, the center of gravity of the rectangle shape of the valid pixel area is located on the optical axis LX of the camera lens 67.

The imaging unit 39a, the plate 64a, and the movable circuit board 49a are attached, in this order along the optical axis LX direction, viewed from the side of the camera lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the camera lens 67. In the case where the plate 64a is made of a metallic material, the plate 64a has the effect of radiating heat from the imaging device 39a1, by contacting the imaging device 39a1.

The first driving coil 31a, the second driving coil 32a, and the first position-detecting coil 41a are attached to the movable circuit board 49a.

The first driving coil 31a forms a seat and a spiral shape coil pattern. The coil pattern of the first driving coil 31a has lines which are parallel to the second direction y, where the movable unit 30a which includes the first driving coil 31a, is moved in the first direction x, by the first electro-magnetic force. The lines which are parallel to the second direction y, are used for moving the movable unit 30a in the first direction x. The lines which are parallel to the second direction y, have a first effective length L1.

The first electro-magnetic force occurs on the basis of the current direction of the first driving coil 31a and the magnetic-field direction of the first driving magnet 33b.

The second driving coil 32a forms a seat and a spiral shape coil pattern. The coil pattern of the second driving coil 32a has lines which are parallel to the first direction x, where the movable unit 30a which includes the second driving coil 32a, is moved in the second direction y, by the second electro-magnetic force. The lines which are parallel to the first direction x, are used for moving the movable unit 30a in the second direction y. The lines which are parallel to the first direction x, have a second effective length L2.

The second electro-magnetic force occurs on the basis of the current direction of the second driving coil 32a and the magnetic-field direction of the second driving magnet 34b.

The first position-detecting coil 41a is a coil which forms a seat and spiral shape coil pattern.

The first and second driving coils 31a and 32a are connected with the first driver circuit 29 which drives the first and second driving coils 31a and 32a through the flexible circuit board (not depicted). The first PWM duty dx is input to the first driver circuit 29 from the PWM 0 of the CPU 21, and the second PWM duty dy is input to the first driver circuit 29 from the PWM 1 of the CPU 21. The first driver circuit 29 supplies power to the first driving coil 31a corresponding to the value of the first PWM duty dx, and to the second driving coil 32a corresponding to the value of the second PWM duty dy, to drive the movable unit 30a.

The first position-detecting coil 41a is one coil which has a first position-detecting area 41a1 and a second position-detecting area 41a2. The first position-detecting area 41a1 is used for detecting a position of the movable unit 30a in the first direction x, as a first location. The second position-detecting area 41a2 is used for detecting a position of the movable unit 30a in the second direction y, as a second location.

The first position-detecting area 41a1 has first horizontal position-detecting segments LH1, second horizontal position-detecting segments LH2, and first short-segments LS1.

The first and second horizontal position-detecting segments LH1 and LH2 and the first short-segments LS1 are parts of the first position-detecting coil 41a, and face the horizontal hall element hh10 of the hall element unit 44b which is described later. The first and second horizontal position-detecting segments LH1 and LH2 are parallel to the second direction y.

The direction of the current through the first horizontal position-detecting segments LH1 is opposite to the direction of the current through the second horizontal position-detecting segments LH2.

The first short-segments LS1 are parallel to the first direction x, and are connected with the first and second horizontal position-detecting segments LH1 and LH2.

The second position-detecting area 41a2 has first vertical position-detecting segments LV1, second vertical position-detecting segments LV2, and second short-segments LS2. The first and second vertical position-detecting segments LV1 and LV2 and the second short-segments LS2 are parts of the first position-detecting coil 41a, and face the vertical hall element hv10 of the hall element unit 44b which is described later. The first and second vertical position-detecting segments LV1 and LV2 are parallel to the first direction x.

The direction of the current through the first vertical position-detecting segments LV1 is opposite to the direction of the current through the second vertical position-detecting segments LV2.

The second short-segments LS2 are parallel to the second direction y, and are connected with the first and second vertical position-detecting segments LV1 and LV2.

The first and second horizontal position-detecting segments LH1 and LH2 and the first and second vertical position-detecting segments LV1 and LV2 are composed of coil segments. The number of segments is the same as the number of times the first position-detecting coil 41a is wound round.

The number of times the first position-detecting coil 41a is wound round is in integers of 1 or more, so that the number of segments of the first and second horizontal position-detecting segments LH1 and LH2 and the first and second vertical position-detecting segments LV1 and LV2 is equal to 1 or integers greater than 1.

Figure 6:
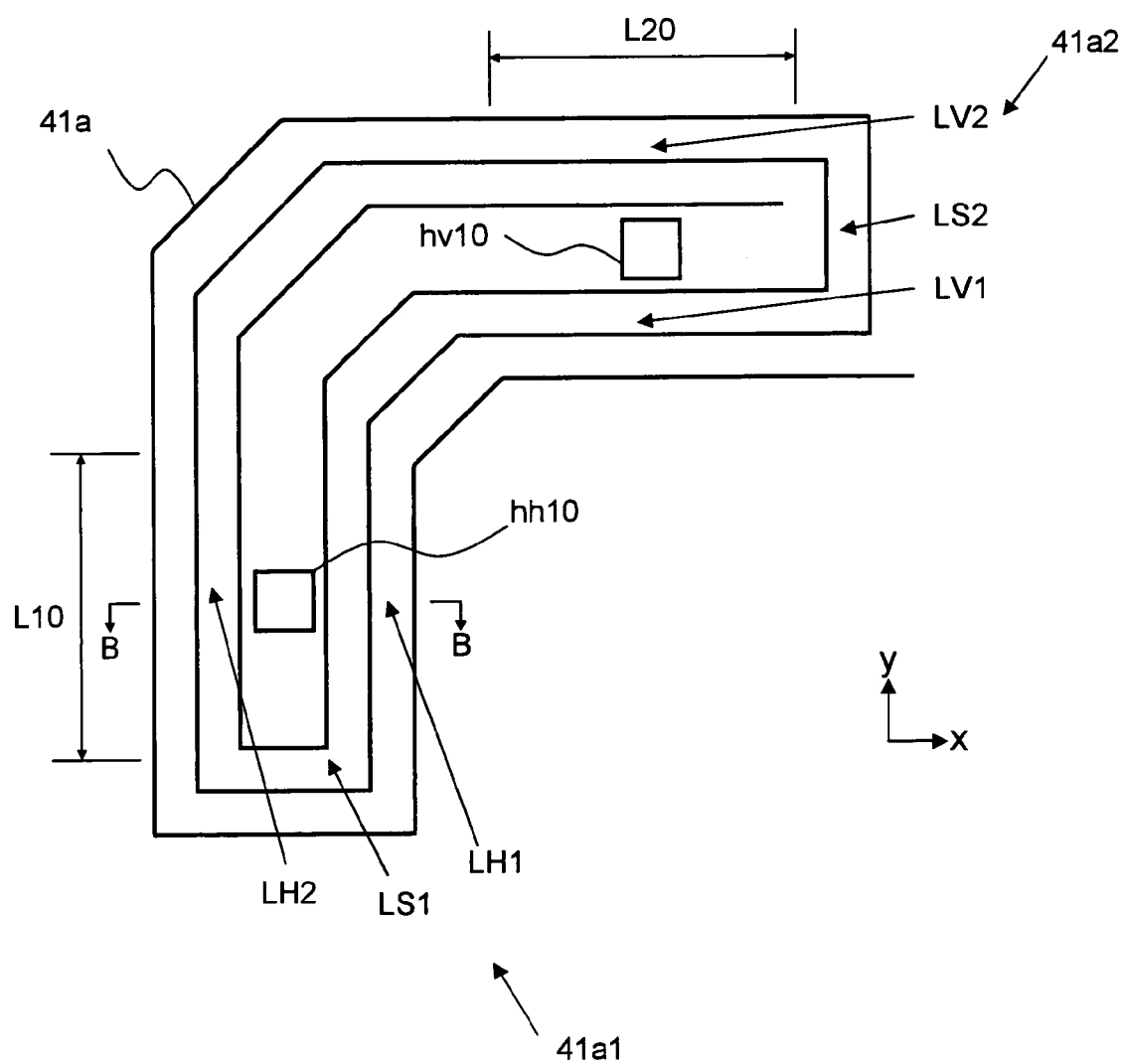
FIG. 6 is a figure showing the construction of the position-detecting coil and the horizontal hall element and vertical hall element, of the first embodiment.
Figure 7:
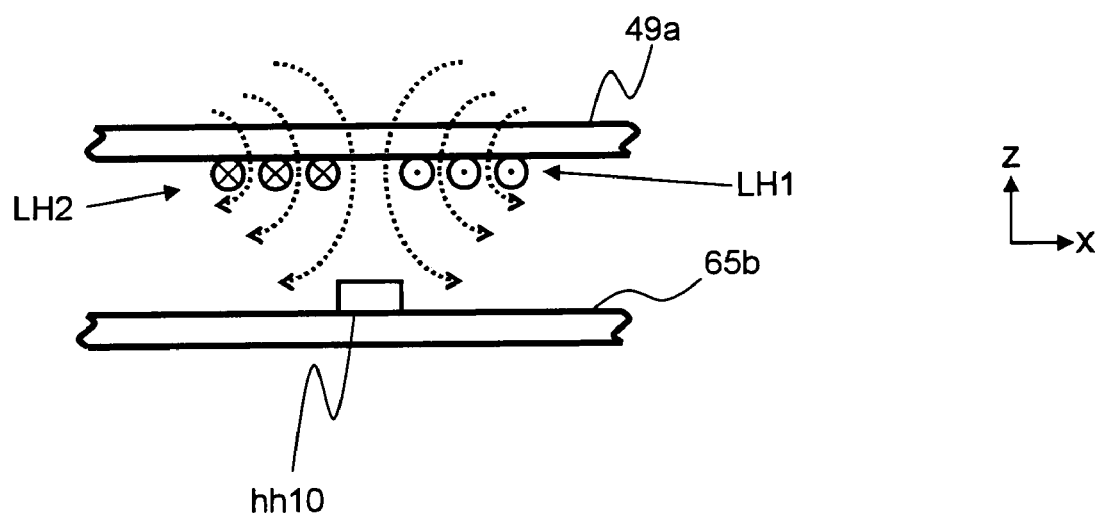
FIG. 7 is a view along line B-B of FIG. 6.

In the first embodiment, the number of times the first position-detecting coil 41a is wound round is 3, so that the number of first and second horizontal position-detecting segments LH1 and LH2 and the number of first and second vertical position-detecting segments LV1 and LV2 is 3 (see FIGS. 6 and 7).

Magnetic-fields are generated radially around the first horizontal position-detecting segments LH1, on the basis of the current which flows through the first horizontal position-detecting segments LH1 (the first position-detecting coil 41a).

Magnetic-fields are generated radially around the second horizontal position-detecting segments LH2, on the basis of the current which flows through the second horizontal position-detecting segments LH2 (the first position-detecting coil 41a).

The direction of the magnetic-fields, which are generated around the first and second horizontal position-detecting segments LH1 and LH2, is almost parallel to the third direction z, near the horizontal hall element hh10.

FIG. 7 shows lines of magnetic force on the basis of the magnetic-fields, which flow from the movable circuit board 49a to the base board 65b.

A magnetic-field is formed from the magnetic-fields that are generated radially around the first vertical position-detecting segments LV1, on the basis of the current which flows through the first vertical position-detecting segments LV1 (the first position-detecting coil 41a).

Another magnetic-field is formed from the magnetic-fields that are generated radially around the second vertical position-detecting segments LV2, on the basis of the current which flows through the second vertical position-detecting segments LV2 (the first position-detecting coil 41a).

The direction of the magnetic-fields, which are generated around the first and second vertical position-detecting segments LV1 and LV2, is almost parallel to the third direction z, near the vertical hall element hv10.

The first and second horizontal position-detecting segments LH1 and LH2 have a first effective position-detecting length L10, where the magnetic-field, which is formed from the magnetic-fields which are generated radially around the first and second horizontal position-detecting segments LH1 and LH2, and which influences the horizontal hall element hh10, is not changed during movement of the movable unit 30a in the second direction y. The first effective position-detecting length L10 is longer than the movement range of the movable unit 30a in the second direction y.

The first and second vertical position-detecting segments LV1 and LV2 have a second effective position-detecting length L20, where the magnetic-field, which is formed from the magnetic-fields which are generated radially around the first and second vertical position-detecting segments LV1 and LV2, and which influences the vertical hall element hv10, is are not changed during movement of the movable unit 30a in the first direction x. The second effective position-detecting length L20 is longer than the movement range of the movable unit 30a in the first direction x.

The lengths of the parts such as the first and second short-segments LS1 and LS2, (the parts other than the first and second horizontal position-detecting segments LH1 and LH2 and the first and second vertical position-detecting segments LV1 and LV2) of the first position-detecting coil 41a, are shorter than the first and second effective position-detecting lengths L10 and L20.

Further, the lengths of the first short-segments LS1 are longer than the movement range of the horizontal hall element hh10 (the movable unit 30a) in the first direction x. Similarly, the lengths of the second short-segment LS2 are longer than the movement range of the vertical hall element hv10 (the movable unit 30a) in the second direction y.

Accordingly, the first short-segments LS1 generate magnetic-fields when current flows through the first short-segments LS1 (the first position-detecting coil 41a), however, the influence of the magnetic-field which is formed from the magnetic-fields which are generated radially around the first short-segments LS1, on the horizontal hall element hh10, can be restrained, in comparison with the influence of the magnetic-field which is formed from the magnetic-fields which are generated radially around the first and second horizontal position-detecting segments LH1 and LH2, on the horizontal hall element hh10.

Similarly, the second short-segments LS2 generate magnetic-fields when current flows through the second short-segments LS2 (the first position-detecting coil 41a), however, the influence of the magnetic-field which is formed from the magnetic-fields which are generated radially around the second short-segments LS2, on the vertical hall element hv10, can be restrained, in comparison with the influence of the magnetic-field which is formed from the magnetic-fields which are generated radially around the first and second vertical position-detecting segments LV1 and LV2, on the vertical hall element hv10.

Therefore, the position-detecting accuracy, when using the first and second horizontal position-detecting segments LH1 and LH2 and the horizontal hall element hh10 and when using the first and second vertical position-detecting segments LV1 and LV2 and the vertical hall element hv10, can be improved in comparison with when the lengths of the first and second short-segments LS1 and LS2 are not shorter than the first and second effective position-detecting lengths L10 and L20.

The outer circumference of the first position-detecting coil 41a forms an L character shape, viewed from the third direction z. Accordingly, the first position-detecting coil 41a can be arranged on the edge side of the movable circuit board 49a in both the first direction x and the second direction y, viewed from the third direction z, so that the first position-detecting coil 41a and the hall element unit 44b can be arranged in the vacant space of the anti-shake apparatus 30.

Because the first position-detecting coil 41a has a seat and spiral shape coil pattern, the thickness of the first position-detecting coil 41a, in the third direction z, can be thinned down in the third direction z, in comparison with when the permanent magnet is used as the magnetic-field generating apparatus for detecting the position of the movable unit 30a.

Therefore, it is possible to reduce the size of the anti-shake apparatus 30, by reducing the distance between the movable unit 30a and the fixed unit 30b in the third direction z.

Further, the first position-detecting coil 41a may consist of a plurality of seat coils which are layered in the third direction z. Even if the first position-detecting coil 41a consists of some seat coils which are layered in the third direction z, the thickness of the first position-detecting coil 41a is not increased in the third direction z, however, the number of times the first position-detecting coil 41a is wound round can be increased, so that the magnetic-flux density between the first position-detecting coil 41a and the hall element unit 44b can be raised, and position-detecting accuracy can be improved.

The first position-detecting coil 41a is connected with the second driver circuit 48, which drives the first position-detecting coil 41a, through the flexible circuit board (not depicted). The second driver circuit 48 determines the supply of electricity to the first position-detecting coil 41a, on the basis of the on state of the signal output from the port P50 of the CPU 21, and stops the supply of electricity to the first position-detecting coil 41a, on the basis of the off state of the signal output from the port P50 of the CPU 21.

The first driving magnet 33b is attached to the movable unit side of the fixed unit 30b, where the first driving magnet 33b faces the first driving coil 31a in the third direction z.

The second driving magnet 34b is attached to the movable unit side of the fixed unit 30b, where the second driving magnet 34b faces the second driving coil 32a in the third direction z.

The hall element unit 44b is attached to the movable unit side of the fixed unit 30b, where the hall element unit 44b faces the first position-detecting coil 41a in the third direction z.

The first driving magnet 33b is attached to the first driving yoke 35b, under the condition where the N pole and S pole are arranged in the first direction x. The first driving yoke 35b is attached to the base board 65b of the fixed unit 30b, on the side of the movable unit 30a, in the third direction z.

The length of the first driving magnet 33b in the second direction y, is longer in comparison with the first effective length L1 of the first driving coil 31a. The magnetic-field which influences the first driving coil 31a, is not changed during movement of the movable unit 30a in the second direction y.

The second driving magnet 34b is attached to the second driving yoke 36b, under the condition where the N pole and S pole are arranged in the second direction y. The second driving yoke 36b is attached to the base board 65b of the fixed unit 30b, on the side of the movable unit 30a, in the third direction z.

The length of the second driving magnet 34b in the first direction x, is longer in comparison with the second effective length L2 of the second driving coil 32a. The magnetic-field which influences the second driving coil 32a, is not changed during movement of the movable unit 30a in the first direction x.

The first driving yoke 35b is made of a soft magnetic material, and forms a square-u-shape channel when viewed from the second direction y. The first driving magnet 33b and the first driving coil 31a are inside the channel of the first driving yoke 35b.

The side of the first driving yoke 35b, which contacts the first driving magnet 33b, prevents the magnetic-field of the first driving magnet 33b from leaking to the surroundings.

The other side of the first driving yoke 35b (which faces the first driving magnet 33b, the first driving coil 31a, and the movable circuit board 49a) raises the magnetic-flux density between the first driving magnet 33b and the first driving coil 31a.

The second driving yoke 36b is made of a soft magnetic material, and forms a square-u-shape channel when viewed from the first direction x. The second driving magnet 34b and the second driving coil 32a are inside the channel of the second driving yoke 36b.

The side of the second driving yoke 36b, which contacts the second driving magnet 34b, prevents the magnetic-field of the second driving magnet 34b from leaking to the surroundings.

The other side of the second driving yoke 36b (which faces the second driving magnet 34b, the second driving coil 32a, and the movable circuit board 49a) raises the magnetic-flux density between the second driving magnet 34b and the second driving coil 32a.

The hall element unit 44b is a one-axis hall element which has two hall elements that are magnetoelectric converting elements (magnetic-field change-detecting elements) using the Hall Effect. The hall element unit 44b detects the first detected-position signal px which is used for specifying the first location in the first direction x for the present position P of the movable unit 30a, and the second detected-position signal py which is used for specifying the second location in the second direction y for the present position P of the movable unit 30a.

Figure 8:
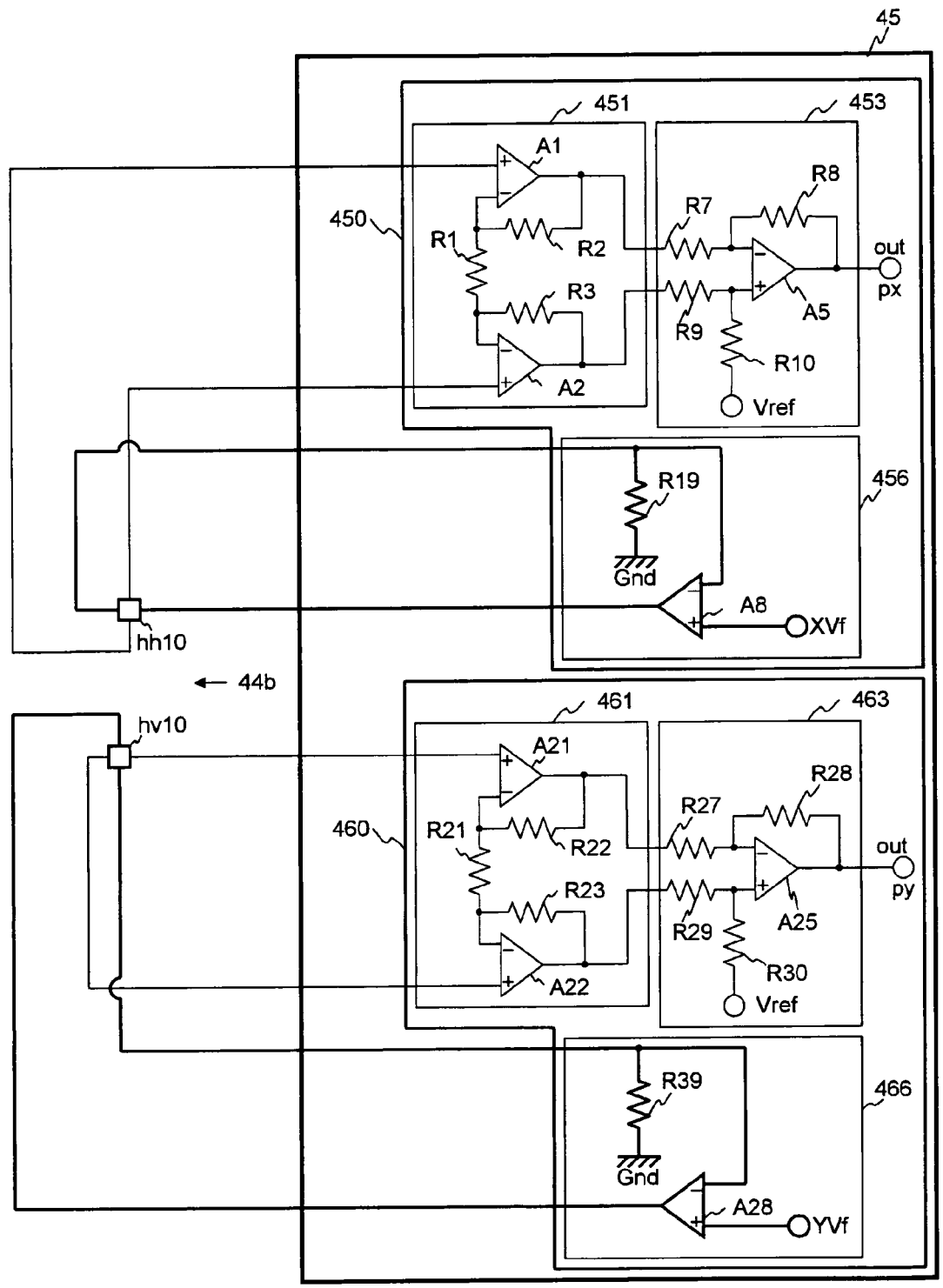
FIG. 8 is a circuit construction diagram of the circuit the hall element unit and the hall-element signal-processing unit.

One of the two hall elements is a horizontal hall element hh10 for detecting the first location in the first direction x of the movable unit 30a, so that the other is a vertical hall element hv10 for detecting the second location in the second direction y of the movable unit 30a (see FIG. 8).

The horizontal hall element hh10 is attached to the base board 65b of the fixed unit 30b, under the condition where the horizontal hall element hh10 faces the first position-detecting area 41a1 of the first position-detecting coil 41a of the movable unit 30a, in the third direction z.

The vertical hall element hv10 is attached to the base board 65b of the fixed unit 30b, under the condition where the vertical hall element hv10 faces the second position-detecting area 41a2 of the first position-detecting coil 41a of the movable unit 30a, in the third direction z.

When the center of the imaging device 39a1, passes through the optical axis LX, it is desirable that the horizontal hall element hh10 is located at a place on the hall element unit 44b which faces an intermediate area between the first and second horizontal position-detecting segments LH1 and LH2 of the first position-detecting coil 41a in the first direction x, to perform the position-detecting operation utilizing the full size of the first position-detecting area 41a1.

Further, when the center of the imaging device 39a1, passes through the optical axis LX, it is desirable that the horizontal hall element hh10 is located at a place on the hall element unit 44b which faces an intermediate area of the first horizontal position-detecting segments LH1 (or the second horizontal position-detecting segments LH2) in the second direction y, in other words, which faces an intermediate area of the segments which form the first effective position-detecting length L10.

Similarly, when the center of the imaging device 39a1, passes through the optical axis LX, it is desirable that the vertical hall element hv10 is located at a place on the hall element unit 44b which faces an intermediate area between the first and second vertical position-detecting segments LV1 and LV2 of the second position-detecting area 41a2 in the second direction y, to perform the position-detecting operation utilizing the full size of the second position-detecting area 41a2.

Further, when the center of the imaging device 39a1, passes through the optical axis LX, it is desirable that the vertical hall element hv10 is located at a place on the hall element unit 44b which faces an intermediate area of the first vertical position-detecting segments LV1 (or the second vertical position-detecting segments LV2) in the first direction x, in other words, which faces an intermediate area of the segments which form the second effective position-detecting length L20.

The base board 65b is a plate state member which becomes the base for attaching the hall element unit 44b etc., and is arranged being parallel to the imaging surface of the imaging device 39a1.

In this embodiment, the base board 65b is arranged at the side nearer to the camera lens 67 in comparison with the movable circuit board 49a, in the third direction z. However, the movable circuit board 49a may be arranged at the side nearer to the camera lens 67 in comparison with the base board 65b. In this case, the first and second driving coils 31a and 32a, and the first position-detecting coil 41a are arranged on the opposite side of the movable circuit board 49a to the camera lens 67, so that the first and second driving magnets 33b and 34b, and the hall element unit 44b are arranged on the same side of the base board 65b as the camera lens 67.

The hall-element signal-processing unit 45 has a first hall-element signal-processing circuit 450 and a second hall-element signal-processing circuit 460.

The first hall-element signal-processing circuit 450 detects a horizontal potential-difference x10 between output terminals of the horizontal hall element hh10, based on an output signal of the horizontal hall element hh10.

The first hall-element signal-processing circuit 450 outputs the first detected-position signal px, which specifies the first location in the first direction x of the movable unit 30a, to the A/D converter A/D 2 of the CPU 21, on the basis of the horizontal potential-difference x10.

The second hall-element signal-processing circuit 460 detects a vertical potential-difference y10 between output terminals of the vertical hall element hv10, based on an output signal of the vertical hall element hv10.

The second hall-element signal-processing circuit 460 outputs the second detected-position signal py, which specifies the second location in the second direction y of the movable unit 30a, to the A/D converter A/D 3 of the CPU 21, on the basis of the vertical potential-difference y10.

A first voltage XVf is applied to the circuit 456 of the first hall-element signal-processing unit 450, from the D/A converter D/A 0 of the CPU 21.

A second voltage YVf is applied to the circuit 466 of the second hall-element signal-processing unit 460, from the D/A converter D/A 1 of the CPU 21.

The circuit construction regarding input/output signals of the horizontal hall element hh10, in the first hall-element signal-processing circuit 450 of the hall-element signal-processing circuit 45, and the circuit construction regarding input/output signals of the vertical hall element hv10, in the second hall-element signal-processing circuit 460 of the hall-element signal-processing circuit 45 are explained using FIG. 8.

The first hall-element signal-processing circuit 450 has a circuit 451 and a circuit 453 for controlling the output of the horizontal hall element hh10, and has a circuit 456 for controlling the input of the horizontal hall element hh10.

The second hall-element signal-processing circuit 460 has a circuit 461 and a circuit 463 for controlling the output of the vertical hall element hv10, and has a circuit 466 for controlling the input of the vertical hall element hv10.

Both output terminals of the horizontal hall element hh10 are connected with the circuit 451, so that the circuit 451 is connected with the circuit 453.

The circuit 451 is a differential amplifier circuit which amplifies the signal difference between the output terminals of the horizontal hall element hh10.

The circuit 453 is a subtracting amplifier circuit which calculates the horizontal potential-difference x10 (the hall output voltage) on the basis of the difference between the amplified signal difference from the circuit 451 and a reference voltage Vref, and which calculates the first detected-position signal px by multiplying a predetermined amplification rate by the horizontal potential-difference x10.

The circuit 451 has a resistor R1, a resistor R2, a resistor R3, an operational amplifier A1, and an operational amplifier A2. The operational amplifier A1 has an inverting input terminal, a non-inverting input terminal, and an output terminal. The operational amplifier A2 has an inverting input terminal, a non-inverting input terminal, and an output terminal.

One of the output terminals of the horizontal hall element hh10 is connected with the non-inverting input terminal of the operational amplifier A1, so that the other terminal of the horizontal hall element hh10 is connected with the non-inverting input terminal of the operational amplifier A2.

The inverting input terminal of the operational amplifier A1 is connected with the resistors R1 and R2, so that the inverting input terminal of the operational amplifier A2 is connected with the resistors R1 and R3.

The output terminal of the operational amplifier A1 is connected with the resistor R2 and the resistor R7 in the circuit 453. The output terminal of the operational amplifier A2 is connected with the resistor R3 and the resistor R9 in the circuit 453.

The circuit 453 has a resistor R7, a resistor R8, a resistor R9, a resistor R10, and an operational amplifier A5. The operational amplifier A5 has an inverting input terminal, a non-inverting input terminal, and an output terminal.

The inverting input terminal of the operational amplifier A5 is connected with the resistors R7 and R8. The non-inverting input terminal of the operational amplifier A5 is connected with the resistors R9 and R10. The output terminal of the operational amplifier A5 is connected with the resistor R8. The first detected-position signal px, which is obtained by multiplying the predetermined amplification rate, by the horizontal potential-difference x10, is output from the output terminal of the operational amplifier A5. One of the terminals of the resistor R10 is connected with the power supply whose voltage is the reference voltage Vref.

The values of the resistors R2 and R3 are the same. The values of the resistors R7 and R9 are the same. The values of the resistors R8 and R10 are the same.

This predetermined amplification rate is based on the values of the resistors R7~R10 (the ratio of the value of the resistor R7 to the value of the resistor R8).

The operational amplifiers A1 and A2 are the same type of amplifier.

The circuit 456 has a resistor R19 and an operational amplifier A8. The operational amplifier A8 has an inverting input terminal, a non-inverting input terminal, and an output terminal.

The inverting input terminal of the operational amplifier A8 is connected with the resistor R19 and one of the input terminals of the horizontal hall element hh10. The potential of the non-inverting input terminal of the operational amplifier A8 is set at the first voltage XVf corresponding to the value of the current that flows through the input terminals of the horizontal hall element hh10. The value of the first voltage XVf is obtained by multiplying the value of the current flowing through the input terminals of the horizontal hall element hh10 by the value of the resistor R19. The first voltage XVf is applied to the circuit 456, from the D/A converter D/A 0 of the CPU 21. The output terminal of the operational amplifier A8 is connected with the other input terminal of the horizontal hall element hh10. One of the terminals of the resistor R19 is grounded.

Both output terminals of the vertical hall element hv10 are connected with the circuit 461, so that the circuit 461 is connected with the circuit 463.

The circuit 461 is a differential amplifier circuit which amplifies the signal difference between the output terminals of the vertical hall element hv10.

The circuit 463 is a subtracting amplifier circuit which calculates the vertical potential-difference y10 (the hall output voltage) on the basis of the difference between the amplified signal difference from the circuit 461 and a reference voltage Vref, and which calculates the second detected-position signal py by multiplying a predetermined amplification rate by the vertical potential-difference y10.

The circuit 461 has a resistor R21, a resistor R22, a resistor R23, an operational amplifier A21, and an operational amplifier A22. The operational amplifier A21 has an inverting input terminal, a non-inverting input terminal, and an output terminal. The operational amplifier A22 has an inverting input terminal, a non-inverting input terminal, and an output terminal.

One of the output terminals of the vertical hall element hv10 is connected with the non-inverting input terminal of the operational amplifier A21, so that the other terminal of the vertical hall element hv10 is connected with the non-inverting input terminal of the operational amplifier A22.

The inverting input terminal of the operational amplifier A21 is connected with the resistors R21 and R22, so that the inverting input terminal of the operational amplifier A22 is connected with the resistors R21 and R23.

The output terminal of the operational amplifier A21 is connected with the resistor R22 and the resistor R27 in the circuit 463. The output terminal of the operational amplifier A22 is connected with the resistor R23 and the resistor R29 in the circuit 463.

The circuit 463 has a resistor R27, a resistor R28, a resistor R29, a resistor R30, and an operational amplifier A25. The operational amplifier A25 has an inverting input terminal, a non-inverting input terminal, and an output terminal.

The inverting input terminal of the operational amplifier A25 is connected with the resistors R27 and R28. The non-inverting input terminal of the operational amplifier A25 is connected with the resistors R29 and R30. The output terminal of the operational amplifier A25 is connected with the resistor R28. The second detected-position signal py, which is obtained by multiplying the predetermined amplification rate, by the vertical potential-difference y10, is output from the output terminal of the operational amplifier A25. One of the terminals of the resistor R30 is connected with the power supply whose voltage is the reference voltage Vref.

The values of the resistors R22 and R23 are the same. The values of the resistors R27 and R29 are the same. The values of the resistors R28 and R30 are the same.

This predetermined amplification rate is based on the values of the resistors R27~R30 (the ratio of the value of the resistor R27 to the value of the resistor R28).

The operational amplifiers A21 and A22 are the same type of amplifier.

The circuit 466 has a resistor R39 and an operational amplifier A28. The operational amplifier A28 has an inverting input terminal, a non-inverting input terminal, and an output terminal.

The inverting input terminal of the operational amplifier A28 is connected with the resistor R39 and one of the input terminals of the vertical hall element hv10. The potential of the non-inverting input terminal of the operational amplifier A28 is set at the second voltage YVf corresponding to the value of the current that flows through the input terminals of the vertical hall element hv10. The value of the second voltage YVf is obtained by multiplying the value of the current flowing through the input terminals of the vertical hall element hv10 by the value of the resistor R39. The second voltage YVf is applied to the circuit 466, from the D/A converter D/A 1 of the CPU 21. The output terminal of the operational amplifier A28 is connected with the other input terminal of the vertical hall element hv10. One of the terminals of the resistor R39 is grounded.

In the first embodiment, because the position-detecting operation is performed by using a coil (the first position-detecting coil 41a) and a hall element, the weight of the anti-shake apparatus 30 can be reduced, in comparison with when the position-detecting operation is performed by using a permanent magnet and a hall element.

Generally, the electrical parts attached to the movable unit 30a, are electrically connected with the fixed unit 30b etc., through the flexible circuit board etc. The number of the electrical connecting cables for a hall element is more than the number of the electrical connecting cables for a coil. In the first embodiment, because the hall element (the hall element unit 44b) is attached to the fixed unit 30b and the coil (the first position-detecting coil 41a) is attached to the movable unit 30a, the number of the electrical connecting cables for the movable unit 30a can be restrained, in comparison with when the hall element is attached to the movable unit 30a. Or, it is possible to simplify electrical connections, and restrain external forces on the movable unit 30a. The external forces are the mechanical stresses and loads of driving of the movable unit 30a when moving the movable unit 30a etc. Therefore, the size of the anti-shake apparatus 30 can be reduced, and the response of the anti-shake apparatus 30 can be improved.

Next, the second embodiment is explained. In the second embodiment, the movable unit 30a has a second position-detecting coil 410a. The shape of the second position-detecting coil 410a is different from that of the first position-detecting coil 41a of the first embodiment.

The second position-detecting coil 410a has a horizontal position-detecting coil section 411a and a vertical position-detecting coil section 412a.

The horizontal position-detecting coil section 411a has a third position-detecting area 411a1 that is used for detecting a position of the movable unit 30a in the first direction x, as a first location.

Figure 9:
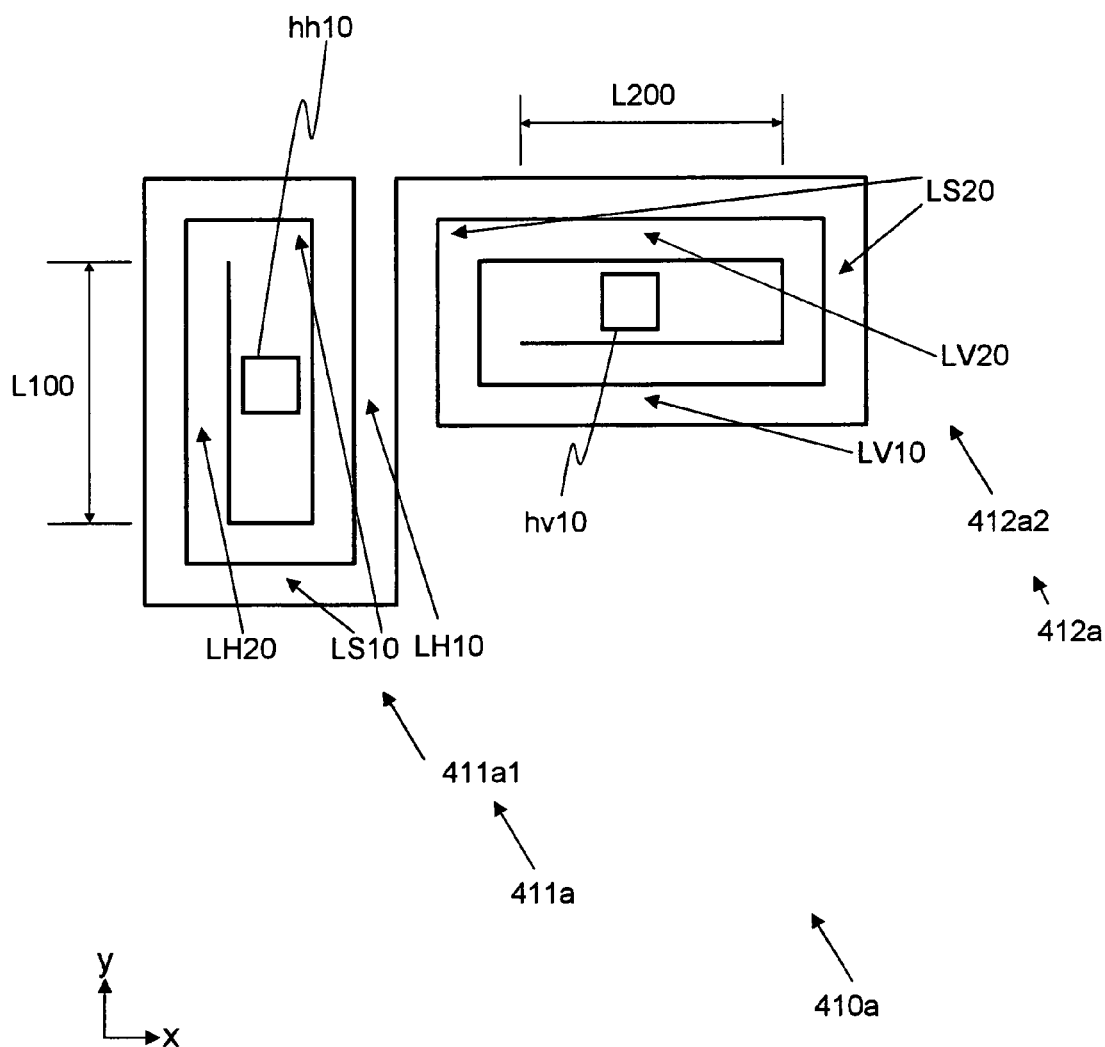
FIG. 9 is a figure showing the construction of the position-detecting coil and the horizontal hall element and the vertical hall element, of the second embodiment.

The vertical position-detecting coil section 412a has a fourth position-detecting area 412a2 that is used for detecting a position of the movable unit 30a in the second direction y, as a second location (see FIG. 9).

The third position-detecting area 411a1 has third horizontal position-detecting segments LH10, fourth horizontal position-detecting segments LH20, and third short-segments LS10.

The third and fourth horizontal position-detecting segments LH10 and LH20 and the third short-segments LS10 are parts of the horizontal position-detecting coil section 411a, and face the horizontal hall element hh10 of the hall element unit 44b. The third and fourth horizontal position-detecting segments LH10 and LH20 are parallel to the second direction y.

The direction of the current through the third horizontal position-detecting segments LH10 is opposite to the direction of the current through the fourth horizontal position-detecting segments LH20.

The third short-segments LS10 are parallel to the first direction x, and are connected with the third and fourth horizontal position-detecting segments LH10 and LH20.

The fourth position-detecting area 412a2 has third vertical position-detecting segments LV10, fourth vertical position-detecting segments LV20, and fourth short-segments LS20.

The third and fourth vertical position-detecting segments LV10 and LV20 and the fourth short-segments LS20 are parts of the vertical position-detecting coil section 412a, and face the vertical hall element hv10 of the hall element unit 44b. The third and fourth vertical position-detecting segments LV10 and LV20 are parallel to the first direction x.

The direction of the current through the third vertical position-detecting segments LV10 is opposite to the direction of the current through the fourth vertical position-detecting segments LV20.

The fourth short-segments LS20 are parallel to the second direction y, and are connected with the third and fourth vertical position-detecting segments LV10 and LV20.

The third and fourth horizontal position-detecting segments LH10 and LH20 are composed of coil segments. The number of segments is the same as the number of times the horizontal position-detecting coil section 411a is wound round.

The number of times the horizontal position-detecting coil section 411a of the second position-detecting coil 410a is wound round is 1 or an integer greater than 1, so that the numbers of segments of the third and fourth horizontal position-detecting segments LH10 and LH20 is 1 or an integer greater than 1.

The third and fourth vertical position-detecting segments LV10 and LV20 are composed of coil segments. The number of segments is the same as the number of times the vertical position-detecting coil section 412a is wound round.

The number of times the vertical position-detecting coil section 412a of the second position-detecting coil 410a is wound round is 1 or an integer greater than 1, so that the number of segments of the third and fourth vertical position-detecting segments LV10 and LV20 is 1 or an integer greater than 1.

In the second embodiment, the number of times the horizontal position-detecting coil section 411a is wound round, is 3, so that the third and fourth horizontal position-detecting segments LH10 and LH20 have 3 segments (see FIG. 9). Similarly, the number of times the vertical position-detecting coil section 412a is wound round, is 3, so that the third and fourth vertical position-detecting segments LV10 and LV20 have 3 segments (see FIG. 9).

Magnetic-fields are generated radially around the third horizontal position-detecting segments LH10, on the basis of the current which flows through the third horizontal position-detecting segments LH10 (the horizontal position-detecting coil section 411a).

Magnetic-fields are generated radially around the fourth horizontal position-detecting segments LH20, on the basis of the current which flows through the fourth horizontal position-detecting segments LH20 (the horizontal position-detecting coil section 411a).

The direction of the magnetic-fields, which are generated around the third and fourth horizontal position-detecting segments LH10 and LH20, is almost parallel to the third direction z, near the horizontal hall element hh10.

The magnetic-fields are generated radially around the third vertical position-detecting segments LV10, on the basis of the current which flows through the third vertical position-detecting segments LV10 (the vertical position-detecting coil section 412a).

The magnetic-fields are generated radially around the fourth vertical position-detecting segments LV20, on the basis of the current which flows through the fourth vertical position-detecting segments LV20 (the vertical position-detecting coil section 412a).

The direction of the magnetic-fields, which are generated around the third and fourth vertical position-detecting segments LV10 and LV20, is almost parallel to the third direction z, near the vertical hall element hv10.

The third and fourth horizontal position-detecting segments LH10 and LH20 have a third effective position-detecting length L100, where the magnetic-field, which is formed from the magnetic fields which are generated radially around the third and fourth horizontal position-detecting segments LH10 and LH20, and which influences the horizontal hall element hh10, is not changed during movement of the movable unit 30a in the second direction y. The third effective position-detecting length L100 is longer than the movement range of the movable unit 30a in the second direction y.

The third and fourth vertical position-detecting segments LV10 and LV20 have a fourth effective position-detecting length L200, where the magnetic-field, which is formed from the magnetic-fields which are generated radially around the third and fourth vertical position-detecting segments LV10 and LV20, and which influences the vertical hall element hv10, is not changed during movement of the movable unit 30a in the first direction x. The fourth effective position-detecting length L200 is longer than the movement range of the movable unit 30a in the first direction x.

The length of the parts such as the third short-segments LS10 (the parts other than the third and fourth horizontal position-detecting segments LH10 and LH20) of the horizontal position-detecting coil section 411a, is shorter than the third effective position-detecting length L100.

The length of the parts such as the fourth short-segments LS20 (the parts other than the third and fourth vertical position-detecting segments LV10 and LV20) of the vertical position-detecting coil section 412a, is shorter than the fourth effective position-detecting length L200.

Further, the lengths of the third short-segments LS10 are longer than the movement range of the horizontal hall element hh10 (the movable unit 30a) in the first direction x. Similarly, the lengths of the fourth short-segments LS20 are longer than the movement range of the vertical hall element hv10 (the movable unit 30a) in the second direction y.

Accordingly, the third short-segments LS10 generate magnetic-fields when current flows through the third short-segments LS10 (the horizontal position-detecting coil section 411a), however, the influence of the magnetic-field which is formed from the magnetic-fields which are generated radially around the third short-segments LS10, on the horizontal hall element hh10, can be restrained, in comparison with the influence of the magnetic-field which is formed from the magnetic-fields which are generated radially around the third and fourth horizontal position-detecting segments LH10 and LH20, on the horizontal hall element hh10.

Similarly, the fourth short-segments LS20 generate magnetic-fields when current flows through the fourth short-segments LS20 (the vertical position-detecting coil section 412a), however, the influence of the magnetic-field which is formed from the magnetic-fields which are generated radially around the fourth short-segments LS20, on the vertical hall element hv10, can be restrained, in comparison with the influence of the magnetic-field which is formed from the magnetic-fields which are generated radially around the third and fourth vertical position-detecting segments LV10 and LV20, on the vertical hall element hv10.

Therefore, the position-detecting accuracy, when using the third and fourth horizontal position-detecting segments LH10 and LH20 and the horizontal hall element hh10 and when using the third and fourth vertical position-detecting segments LV10 and LV20 and the vertical hall element hv10, can be improved in comparison with when the lengths of the third and fourth short-segments LS10 and LS20 are not shorter than the third and fourth effective position-detecting lengths L100 and L200.

The second position-detecting coil 410a forms one stroke drawing shape, where one of the terminals of the horizontal position-detecting coil section 411a is connected with one of the terminals of the vertical position-detecting coil section 412a. Accordingly, the second position-detecting coil 410a can be made, because the horizontal and vertical position-detecting coil sections 411a and 412a do not need to form a special shaped coil.

Further, the horizontal position-detecting coil section 411a can be arranged on the edge area of the movable circuit board in the first direction x, viewed from the third direction z, so that the vertical position-detecting coil section 412a can be arranged on the edge area of the movable circuit board in the second direction y, viewed from the third direction z. Accordingly, the second position-detecting coil 410a and the hall element unit 44b can be arranged in the vacant space of the anti-shake apparatus 30.

The second position-detecting coil 410a (the horizontal and vertical position-detecting coil sections 411a and 412a) has a seat and spiral shape coil pattern, similar to the first position-detecting coil 41a of the first embodiment.

The second position-detecting coil 410a (the horizontal and vertical position-detecting coil sections 411a and 412a) may consist of some seat coils which are layered in the third direction z, similar to the first position-detecting coil 41a of the first embodiment.

When the center of the imaging device 39a1, passes through the optical axis LX, it is desirable that the horizontal hall element hh10 is located at a place on the hall element unit 44b which faces an intermediate area between the third and fourth horizontal position-detecting segments LH10 and LH20 of the horizontal position-detecting coil section 411a in the first direction x, to perform the position-detecting operation utilizing the full size of the third position-detecting area 411a1.

Further, when the center of the imaging device 39a1, passes through the optical axis LX, it is desirable that the horizontal hall element hh10 is located at a place on the hall element unit 44b which faces an intermediate area of the third horizontal position-detecting segments LH10 (or the fourth horizontal position-detecting segments LH20) in the second direction y, in other words, which faces an intermediate area of the segments which form the third effective position-detecting length L100.

Similarly, when the center of the imaging device 39a1, passes through the optical axis LX, it is desirable that the vertical hall element hv10 is located at a place on the hall element unit 44b which faces an intermediate area between the third and fourth vertical position-detecting segments LV10 and LV20 of the vertical position-detecting coil section 412a in the second direction y, to perform the position-detecting operation utilizing the full size of the fourth position-detecting area 412a2.

Further, when the center of the imaging device 39a1, passes through the optical axis LX, it is desirable that the vertical hall element hv10 is located at a place on the hall element unit 44b which faces an intermediate area of the third vertical position-detecting segments LV10 (or the fourth vertical position-detecting segments LV20) in the first direction x, in other words, which faces an intermediate area of the segments which form the fourth effective position-detecting length L200.

The other constructions of the photographing apparatus 1 in the second embodiment are the same as those in the first embodiment.

In the first and second embodiments, it is explained that the movable unit 30a has the imaging device 39a1. However, the movable unit 30a may have a hand-shake correcting lens instead of the imaging device.

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Further, the movable unit 30*a* is movable in the first direction x and the second direction y, relative to the fixed unit 30*b*, so that the position-detecting operation is performed by detecting the position of the movable unit in the first direction x (the first location), and in the second direction y (the second location). However, any other methods (or means) for moving the movable unit 30*a* on a plane which is perpendicular to the third direction z (the optical axis LX), and for detecting the movable unit 30*a* on the plane, are acceptable.

For example, the movement of the movable unit may only be in one dimension, so that the movable unit can be moved only in the first direction x (not the second direction y) In this case, the parts regarding the movement of the movable unit in the second direction y and regarding the position-detecting operation of the movable unit in the second direction y, such as the vertical hall element hv10 etc., may be omitted (see FIG. 3 etc.).

Although these embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-075791 (filed on Mar. 17, 2004), which is expressly incorporated herein by reference, in its entirety.

The invention claimed is:

1. An anti-shake apparatus of a photographing apparatus, comprising:

a movable unit that has one of an imaging device and a hand-shake correcting lens, and that has a position-detecting coil, and that can be moved in first and second directions, said first direction being perpendicular to an optical axis of a camera lens of said photographing apparatus, and said second direction being perpendicular to said optical axis and said first direction; and a fixed unit that slidably supports said movable unit in both said first and second directions, and that has a magnetic-field change-detecting unit;

said magnetic-field change-detecting unit having a horizontal magnetic-field change-detecting element which is used for detecting a position of said movable unit in said first direction, as a first location, and a vertical magnetic-field change-detecting element which is used for detecting a position of said movable unit in said second direction, as a second location;

said position-detecting coil being a magnetic-field generating apparatus which is used for detecting said first and second locations, and having first and second position-detecting areas;

said first position-detecting area having first and second horizontal position-detecting segments;

said second position-detecting area having first and second vertical position-detecting segments;

said first and second horizontal position-detecting segments being parts of said position-detecting coil, and facing said horizontal magnetic-field change-detecting element, and being parallel to said second direction;

a direction of the current through said first horizontal position-detecting segment being opposite to a direction of the current through said second horizontal position-detecting segment;

said first and second vertical position-detecting segments being parts of said position-detecting coil, and facing said vertical magnetic-field change-detecting element, and being parallel to said first direction; and a direction of the current through said first vertical position-detecting segment being opposite to a direction of the current through said second vertical position-detecting segment.

2. The anti-shake apparatus according to claim 1, wherein said position-detecting coil is one position-detecting coil;

said first and second position-detecting areas are parts of said one position-detecting coil; and an outer circumference of said position-detecting coil forms an L character shape, viewed from a third direction which is parallel to said optical axis.

3. The anti-shake apparatus according to claim 1, wherein said position-detecting coil has a horizontal position-detecting coil section which has said first position-detecting area, and a vertical position-detecting coil section which has said second position-detecting area.

4. The anti-shake apparatus according to claim 3, wherein said position-detecting coil forms one stroke drawing shape, where one of the terminals of said horizontal position-detecting coil section is connected with one of the terminals of said vertical position-detecting coil section.

5. The anti-shake apparatus according to claim 1, wherein said position-detecting coil forms a seat and a spiral shape coil pattern.

6. The anti-shake apparatus according to claim 5, wherein said position-detecting coil consists of a plurality of seat coils which are layered in a third direction which is parallel to said optical axis.

7. The anti-shake apparatus according to claim 1, wherein when the center of one of said imaging device and said hand-shake correcting lens which is included in said movable unit, passes through said optical axis, said horizontal magnetic-field change-detecting element is located at a place on said magnetic-field change-detecting unit which faces an intermediate area between said first and second horizontal position-detecting segments in said first direction, and said vertical magnetic-field change-detecting element is located at a place on said magnetic-field change-detecting unit which faces an intermediate area between said first and second vertical position-detecting segments in said second direction.

8. The anti-shake apparatus according to claim 1, wherein said horizontal magnetic-field change-detecting element and said vertical magnetic-field change-detecting element are hall elements.

9. An anti-shake apparatus of a photographing apparatus, comprising:

a movable unit that has one of an imaging device and a hand-shake correcting lens, and that has a position-detecting coil, and that can be moved on a plane which is perpendicular to an optical axis of a camera lens of said photographing apparatus; and a fixed unit that supports said movable unit so as to be movable on said plane, and that has a magnetic-field change-detecting unit for detecting a position of said movable unit on said plane;

said position-detecting coil being a magnetic-field generating apparatus which is used for detecting said position, and having first and second position-detecting segments;

said first and second position-detecting segments being parts of said position-detecting coil, and facing said magnetic-field change-detecting unit, and being perpendicular to a movement direction of said movable unit and to said optical axis; and a direction of the current through said first position-detecting segment being opposite to a direction of the current through said second position-detecting segment.

* * * * *